United States Patent [19]

Wilson

[11] 3,727,479
[45] Apr. 17, 1973

[54] COMBINED TRANSMISSION

[75] Inventor: Ronald E. Wilson, Lee's Summit, Mo.

[73] Assignee: Allis-Chalmers Corporatn, Milwaukee, Wis.

[22] Filed: June 25, 1971

[21] Appl. No.: 156,873

[52] U.S. Cl. .................................. 74/333, 74/360
[51] Int. Cl. ........................................ F16h 3/08
[58] Field of Search ............ 74/360, 359, 357, 74/333

[56] References Cited

UNITED STATES PATENTS

| | | | |
|---|---|---|---|
| 3,232,125 | 2/1966 | Lee et al. | 74/360 X |
| 2,526,919 | 10/1950 | Wilson | 74/333 |
| 2,753,725 | 7/1956 | DeVlieg | 74/333 |
| 2,825,232 | 3/1958 | Sieving et al. | 74/360 X |
| 3,184,984 | 5/1965 | Erdman et al. | 74/330 |
| 3,301,078 | 1/1967 | Michael | 74/360 X |

Primary Examiner—Leonard H. Gerin
Attorney—Kenneth C. McKivett et al.

[57] ABSTRACT

This disclosure is concerned with a transmission particularly adapted for use in a combine harvester and it provides multiple forward and reverse speeds while utilizing a minimum of shafts, bearings and gears.

7 Claims, 3 Drawing Figures

COMBINED TRANSMISSION

This invention relates to change speed gears, especially in motor vehicles, and has special reference to gears of the kind in which the gears are provided with helical teeth.

It is an object of this invention to provide a transmission having a shiftable helical gear for obtaining low speed and reverse.

It is a further object of this invention to provide a transmission having six forward speeds and two speeds in reverse from nine gears.

It is a further object of this invention to provide a transmission having six forward speeds and two speeds in reverse from nine gears and three shafts.

A still further object of the invention is to provide a novel combine harvester transmission wherein the power trains are so arranged as to provide a compact and effecient assembly.

The invention consists in the novel features and in the combinations and constructions hereinafter set forth and claimed.

In describing the invention, reference is had to the accompanying drawings in which like characters designate corresponding parts in all views.

Figure 1:
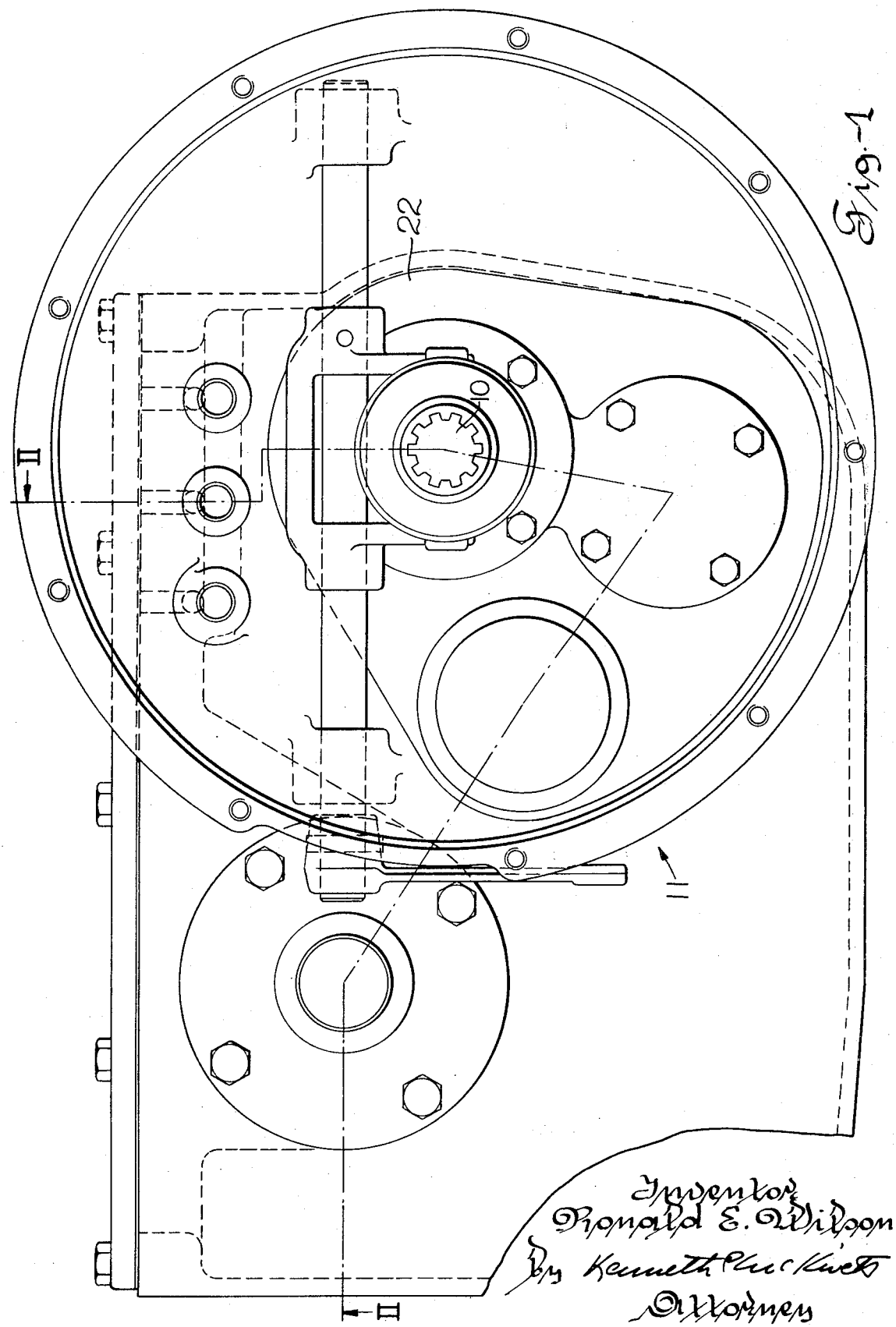
FIG. 1 is an end view of a transmission embodying the invention.

In the drawings, reference numeral 10 is the input shaft of helical gear transmission 11; 12, the driven or output shaft; and 13, the countershaft, these being journaled in bearings 14, 16, 17, 18, 19 and 21, respectively, which are suitably mounted within sidewalls 22 and 23 of transmission 11. A helical reverse or first gear 24 is attached to input shaft 10 by helical spline 26. Helical or second and third gears 27 and 28 are rotatably mounted on shaft 10. Helical or fourth gear 29 is integrally formed, with countershaft 13. Helical or fifth, sixth and seventh gears 31, 32 and 33, respectively, are attached to countershaft 13 for rotation therewith. Helical or eighth and ninth gears 34 and 36 are rotatably mounted on output shaft 12. A helical gear 37 integrally formed with shaft 12 is meshed with helical gear 38 for driving differential 39.

Gears 27 and 28 are mounted on shaft 10 in a conventional manner to prevent movement of such gears along such shaft. Gears 27 and 28 are separated by a double clutch section 41 which is splined to shaft 10 for rotation therewith. Clutch section 41 is provided with a shiftable collar 42 which can be shifted to engage either gear 27 or 28 or to remain in a central neutral position between gears 27 and 28. To provide a driving connection between shaft 10 and gear 27, clutch collar 42 is shifted to the left until a portion of collar 42 is in transverse alignment with tooth 43 formed on the side of the gear 27. Clutch collar 42 can also be shifted to the right to provide a driving connection between shaft 10 and gear 28 which is obtained when clutch collar 42 has been shifted to the right a sufficient distance until a portion of collar 42 is in transverse alignment with tooth 44 formed on the side of gear 28. The means for shifting collar 42 is not shown as it is conventional.

Figure 2:
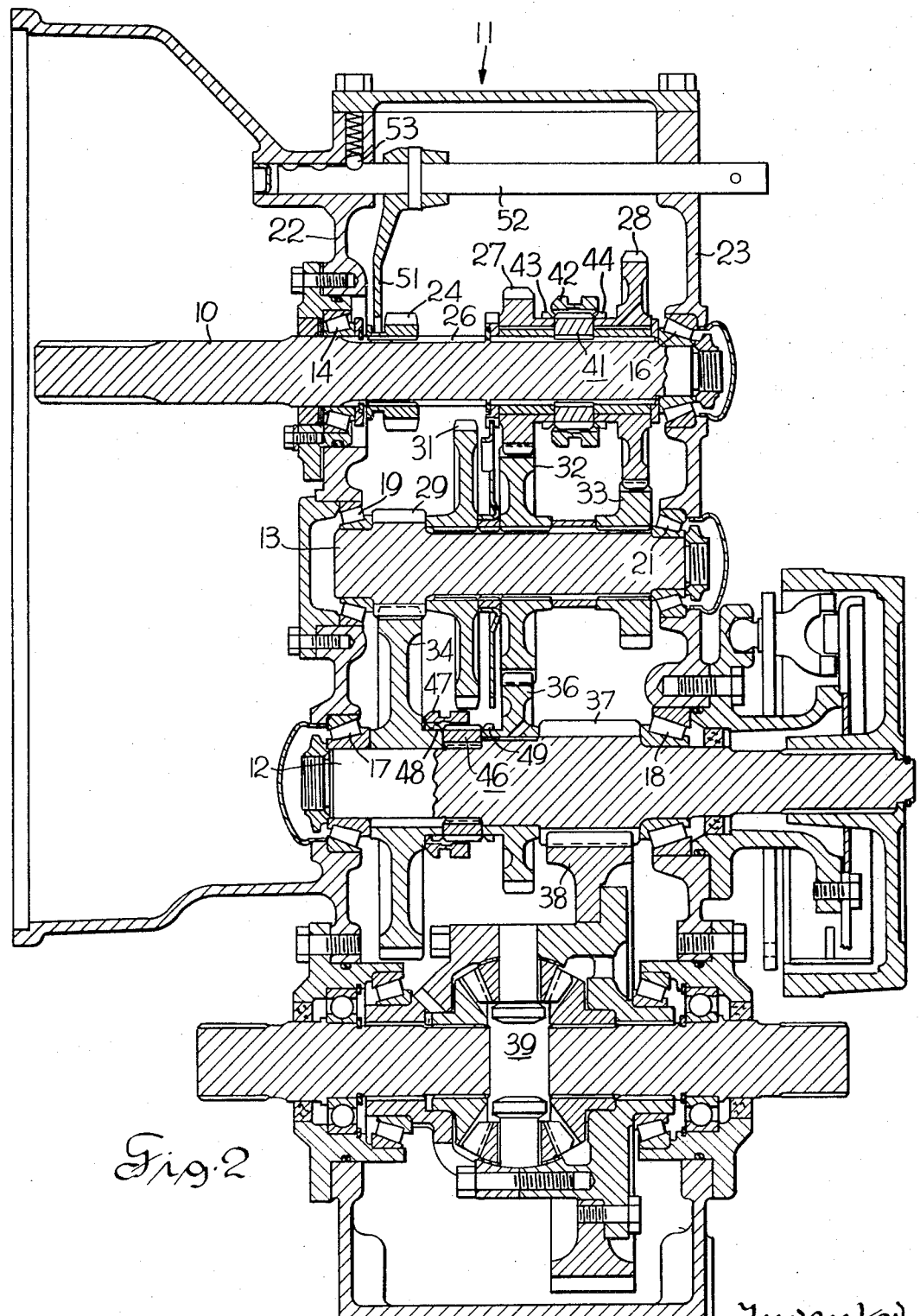
FIG. 2 is a view taken along line II—II of FIG. 1.

Gears 34 and 36 are mounted on shaft 12 in a manner to prevent movement of such gears along such shaft. Gears 34 and 36 are separated by a double clutch section 46 which is splined to output shaft 12 for rotation therewith and clutch section 46 is provided with a shiftable collar 47 which can be shifted to engage either gear 34 or gear 36. To provide a driving connection between shaft 12 and gear 34, clutch collar 47 is shifted to the left as shown in FIG. 2 until transverse alignment with tooth 48 formed on the side of gear 34 is obtained. Clutch collar 47 can also be shifted to the right to provide a driving connection between shaft 12 and gear 36 which is obtained when clutch collar 47 has been shifted to the right sufficiently until a portion of collar 47 is in transverse alignment with tooth 49 formed on the side of gear 36. Collar 47 is shiftable by a conventional gear shift mechanism (not shown).

In this transmission, gear 27 is constantly in mesh with gear 32 and gear 32 is constantly meshed with gear 36. Gear 28 is constantly meshed with gear 33 and gear 29 is constantly meshed with gear 34. Gear 37 is constantly meshed with gear 38.

A gear shifting fork 51 is attached to shift rod 52 which is slidably received in sidewalls 22 and 23. The usual detent mechanism 53 retains rod 52 in any one of three desired positions with gear 24 in engagement with gear 34, in engagement with gear 31 or in engagement with no gear.

Figure 3:
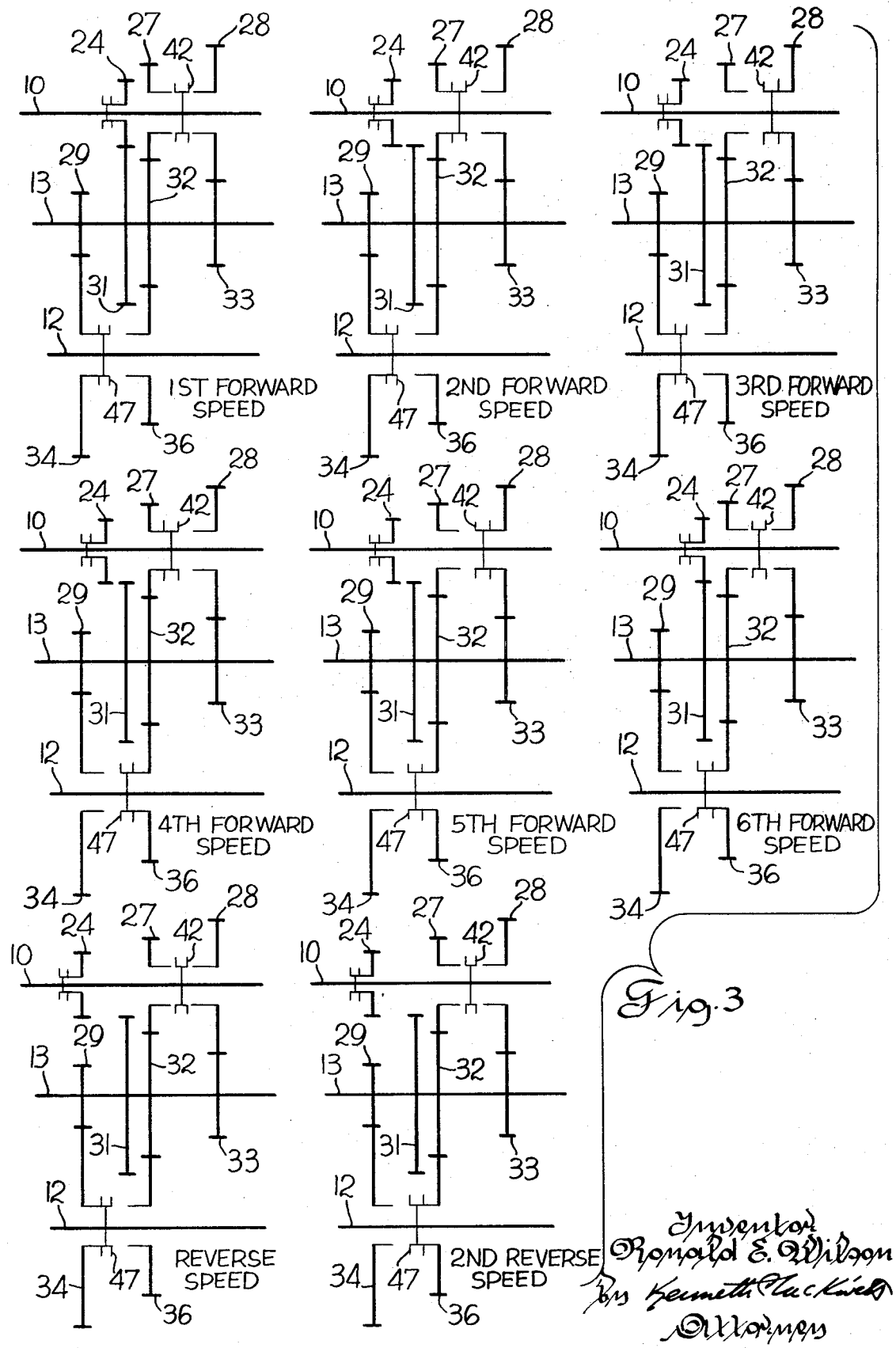
FIG. 3 is a diagrammatic view showing the various speeds obtainable in an embodiment of this invention.

With the aforedescribed transmission, six forward speeds and two reverse speeds are obtainable with only six bearings, three shafts and nine gears. These eight speeds are diagrammatically illustrated in FIG. 3. Only five of the forward speeds and one reverse sped are ordinarily used in speed harvester operation due to the fact that the five forward speeds and one reverse speed adequately supply the need without the additional speeds, however, this sixth speed forward and a second reverse are available in this combination if desired.

First forward speed is obtained by shifting clutch collar 42 to a neutral position midway between gears 27 and 28, shifting gear 24 into mesh with gear 31, and shifting clutch collar 47 to the left connecting shaft 12 with gear 34 wherein shaft 10 drives gear 24, gear 24 drives gear 31 and countershaft 13 splined thereto and gear 29 integral with shaft 13 drives gear 34 and output shaft 12.

Second forward speed is obtained by shifting gear 24 to a neutral position then shifting clutch collar 42 to the left for connecting gear 27 with shaft 10. Gear 27 drives gear 32 and countershaft 13 splined thereto. Clutch collar 47 is shifted to the left engaging gear 34 with shaft 12. Gear 29 on countershaft 13 drives gear 34 and thereby shaft 12.

Third forward speed is obtained by shifting gear 24 to a neutral position then shifting clutch collar 42 to the right for connecting gear 28 with shaft 10. Gear 28 drives gear 33 splined to countershaft 13. Clutch collar 47 is shifted to the left engaging gear 34 with shaft 12. Gear 29 on countershaft 13 drives gear 34 and thereby shaft 12.

Fourth forward speed is obtained by shifting gear 24 to a neutral position if not there already and then shifting clutch collar 42 to the left for connecting gear 27 with shaft 10. Gear 27 drives gear 32 splined to countershaft 13. Clutch collar 47 is shifted to the right engaging gear 36 with shaft 12. Gear 32 drives gear 36 and thereby shaft 12.

Fifth forward speed is obtained by shifting gear 24 to a neutral position if not there already and then shifting clutch collar 42 to the right for connecting gear 28 with shaft 10. Gear 28 drives gear 33 splined to countershaft 13. Clutch collar 47 is shifted to the right joining gear 36 to shaft 12. Gear 32 splined to shaft 13 drives gear 36 and thereby shaft 12.

Sixth forward speed is obtained by shifting clutch collar 42 to a neutral position and shifting gear 24 to a meshing relation with gear 31 which is splined on countershaft 13. Clutch collar 47 is shifted to the right joining gear 36 to shaft 12. Gear 32 splined to countershaft 13 drives gear 36 and shaft 12.

Reverse speed is obtained by shifting clutch collar 42 to a neutral position and shifting clutch collar 47 to the left joining gear 34 with shaft 12 and then shifting gear 24 to mesh with gear 34 for driving same and shaft 12.

A second reverse speed is obtained by shifting clutch collar 42 to a neutral position and shifting clutch collar 47 to the right joining gear 36 to shaft 12. Gear 24 is then shifted into mesh with gear 34 which revolves on shaft 12 and drives gear 29 and countershaft 13 integral therewith. Gear 32 splined to countershaft 13 drives gear 36 and shaft 12.

Accordingly, it is seen that a compact transmission has been provided with short shafts and wherein with only three shafts, six bearings and nine gears, a total of six forward speeds and two reverse speeds has been obtained.

The embodiments of the invention in which an exclusive property or privilege is claimed are defined as follows:

1. In a helical gear transmission mechanism, the combination of an input shaft, a countershaft and an output shaft; said input shaft having a shiftable reversing gear splined thereto; second and third gears rotatably mounted on said input shaft, a first means splined to said input shaft and positioned between said second and third gear and positionable to establish a driving connection between said input shaft and either said second or said third gears or positionable in a neutral position relative to said second and third gears; fourth, fifth, sixth and seventh gears attached to said countershaft for rotation therewith; eighth and ninth gears rotatably mounted on said output shaft; a second means splined to said output shaft and positioned between said eighth and ninth gears and being slidable to establish a driving connection between either said eighth or ninth gear and said output shaft; said second, sixth and ninth gears being continually meshed; said fourth and eighth gears being continually meshed; said reversing gear being shiftable on said input shaft to mesh with said eighth gear to provide a reversing drive to said output shaft when said first means is positioned in said neutral position and said second means is actuated to provide a driving connection between said eighth gear and said output shaft; said reversing gear being shiftable on said input shaft to mesh with said fifth gear to provide a low forward speed when said first means is positioned in neutral and said second means is actuated to provide a driving connection between said eighth gear and said output shaft; said first means being shiftable when said reversing gear is in a neutral position to provide a driving connection between said second gear and said input shaft for providing a second forward speed when said second means has been shifted for driving said output shaft from said eighth gear; said first means being shiftable when said reversing gear is in a neutral position to provide a driving connection between said third gear and said input shaft for providing a third forward speed when said second means has been shifted for driving said output shaft from said eighth gear; said first means being shiftable when said reversing gear is in neutral position to provide a driving connection between said second gear and said input shaft for providing a fourth forward speed when said second means has been shifted for driving said output shaft from said ninth gear; and said first means being shiftable when said reversing gear is in a neutral position to provide a driving connection between said third gear and said drive shaft for providing a fifth forward speed when said second means has been shifted for driving said output shaft from said ninth gear.

2. In a transmission mechanism as is recited in claim 1 and wherein all of said gears are helical.

3. In a helical gear transmission mechanism as is recited in claim 1 and wherein an additional reverse gear train is available when said reversing gear is shifted on said input shaft to mesh with said eighth gear and said first means is positioned in neutral position and said second means is positioned to provide a driving connection between the output shaft and said ninth gear.

4. In a helical gear transmission mechanism as is recited in claim 1 and wherein an additional forward speed is available when said reversing gear is meshed with the fifth gear while said first means is maintained in a neutral position and said second means is acutated to provide a driving connection between said ninth gear and said output shaft.

5. In a transmission mechanism, the combination of an input shaft, a countershaft and an output shaft, said input shaft having a reversing gear splined thereto, a pair of gears rotatably mounted on said input shaft, a first means splined to said input shaft and positioned between said pair of gears and being shiftable to establish a driving connection between said input shaft and either or neither of said gears, said countershaft having a plurality of gears attached thereto, and said output shaft having a pair of gears rotatably mounted thereon, a second means splined to said output shaft and positioned between said output gears and being positionable to establish a driving connection between said output shaft and either of said output gears, said reversing gear being shiftable on said input shaft to mesh with one of said output shaft gears to provide a reverse drive to said output shaft when said second means is actuated to provide a driving connection between said one output gear and said output shaft, said output gears being continually meshed with a pair of said countershaft gears, said reversing gear being shiftable on said input shaft from said meshing relation with said one of said output gears to meshing relation with one of said countershaft gears to provide a forward driving connection between said input shaft and said output shaft, and all of said gears being helical.

6. In a helical gear transmission mechanism as recited in claim 5 and wherein an additional reverse gear train is available by shifting said reverse gear on said input shaft to mesh with one of said output shaft gears and actuating said second means to provide a driving connection between the other of said output shaft gears and said output shaft.

7. In a helical gear transmission mechanism as recited in claim 5 and wherein an additional forward speed is available when said reversing gear is meshed with one of said plurality of gears on said countershaft while said first means is maintained in a neutral position and said second means is actuated to provide a driving connection between the other output shaft gear.

* * * * *